(12) United States Patent
Geissler et al.

(10) Patent No.: US 7,262,880 B2
(45) Date of Patent: Aug. 28, 2007

(54) APPARATUS AND METHOD FOR CREATING COLOR-CALIBRATION CHARACTERISTIC CURVES AND/OR PROCESS-CALIBRATION CHARACTERISTIC CURVES

(75) Inventors: Wolfgang Geissler, Bad Schönborn (DE); Martin Mayer, Ladenburg (DE); Manfred Schneider, Bad Rappenau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 980 days.

(21) Appl. No.: 10/154,600

(22) Filed: May 23, 2002

(65) Prior Publication Data
US 2002/0176103 A1 Nov. 28, 2002

(30) Foreign Application Priority Data
May 23, 2001 (DE) .............................. 101 25 527

(51) Int. Cl.
| B41J 1/00 | (2006.01) |
| G06F 15/00 | (2006.01) |
| G03F 3/08 | (2006.01) |
| G06K 9/00 | (2006.01) |
| H04N 1/46 | (2006.01) |

(52) U.S. Cl. .................. 358/1.9; 358/518; 358/504; 358/501; 382/162; 382/167

(58) Field of Classification Search ............... 358/1.9, 358/1.18, 1.1, 1.12, 1.13, 1.14, 1.15, 1.16, 358/1.11, 1.5, 504–505, 518, 501, 1.6; 347/72, 347/111, 171, 188, 6, 70–71, 220; 101/584, 101/147, 211; 382/162, 167; 346/107.1
See application file for complete search history.

(56) References Cited

U.S. PATENT DOCUMENTS

| 4,792,860 | A | * | 12/1988 | Kuehrle ..................... 358/300 |
| 5,091,859 | A | * | 2/1992 | Zingher et al. ............. 700/117 |
| 6,050,192 | A | | 4/2000 | Kipphan et al. |
| 6,230,622 | B1 | | 5/2001 | Dilling |
| 6,384,932 | B1 | * | 5/2002 | Fujisawa et al. .......... 358/1.18 |
| 6,441,914 | B1 | * | 8/2002 | Barak et al. ............... 358/1.14 |
| 6,449,385 | B1 | | 9/2002 | Huber et al. |
| 6,580,524 | B1 | | 6/2003 | Weichmann et al. |
| 6,856,419 | B2 | * | 2/2005 | Bronstein et al. .......... 358/1.15 |
| 6,999,200 | B2 | * | 2/2006 | Shiraishi ..................... 358/1.9 |

* cited by examiner

*Primary Examiner*—Kimberly Williams
*Assistant Examiner*—Charlotte M. Baker
(74) *Attorney, Agent, or Firm*—Laurence A. Greenberg; Werner H. Stemer; Ralph E. Locher

(57) ABSTRACT

An apparatus and a method for exchanging information about tonal values and calorimetric values between a prepress stage, a printing stage and a quality control stage are provided. The apparatus and the method create characteristic curves which are used to optimize a process calibration and a color calibration.

15 Claims, 2 Drawing Sheets

APPARATUS AND METHOD FOR CREATING COLOR-CALIBRATION CHARACTERISTIC CURVES AND/OR PROCESS-CALIBRATION CHARACTERISTIC CURVES

BACKGROUND OF THE INVENTION

1. Field of the Invention

The invention relates to an apparatus and a method for creating color-calibration characteristic curves and/or process-calibration characteristic curves in a printing system.

In the course of the automation of printing systems, the cooperation between the prepress stage, the printing stage and the quality control stage of modern plants has continuously increased. For this reason, for some time the printing industry has been working to create, in consultation with the various manufacturers of systems which produce both the prepress stage and the printing stage and the associated quality equipment, the standards necessary for this purpose. These standards are intended to ensure that defined interfaces from one unit to the other units located in the processing chain are set up. This has the result that, firstly, the quality requirements on the various units and also on the printed product can be better described and also checked by using the quality features, and, secondly, that it is possible for the components from various manufacturers to be incorporated into the process or to be replaced as appropriate. The technical term used for this is "Cooperation for Integration of Prepress, Press and Post Press" (CIP3).

In this context, it is necessary to perform a so-called process calibration, wherein this procedure currently requires the following steps:
1) Selection of a color management test form, such as IT-8.7, this test form being produced by the prepress stage.
2) Calculation of the color separation data for the printing machine to be calibrated by using a RIP (Raster Image Processor).
3) Exposure of the test form onto the printing plates.
4) Printing of the test form with the printing machine to be calibrated.
5) Measurement of the paper sheet through the use of a suitable measuring instrument.
6) Evaluation of the measured values by using a color management program. This color management program knows the initial data (desired values) for the various test fields of the test form, these data being for example present as LAB values (LAB, L—Lightness, A—redness-greenness, B—blueness-yellowness).
7) Comparison of these initial data with the measured values and determination of a new characteristic curve for the printing process.
8) Supplying the characteristic curves to the prepress stage in order to achieve better results in the future, that is to say results lying closer to the original.

These test forms (IT-8.7) contain almost 1000 different measurement areas, which contain all the possible combinations of printing color rasters and from which it is possible to gather which LAB value produces a specific raster combination in the print. This procedure (steps 1-8) is very complicated, time-consuming and costly and has to be repeated at periodic intervals.

In this context, for a long time it has also been the intention in the printing industry to incorporate the image inspection into the printing process. In addition to the print control strips which are standardized for specific systems and which, outside the printed image, have color information defined in accordance with a strict stipulation, which is then registered by an optical scanning instrument and makes a statement relating to the quality of the printed product, there are systems which take the color information directly from the printed image. European Patent No. EP 0 741 027 B1 relates to a method of localizing errors in the printed image within an extremely short time. For this purpose, through the use of an image registration device, actual image data from the printed product are supplied and, through the use of a comparison circuit, are compared with desired image data from a fault-free subject. The registered printed image is reproduced on a monitor and a faulty inspection area in the printed image, which is reproduced on the monitor, is identified by an overlay frame. The result of the inspection that has been derived from the image detail displayed on the monitor is read into a storage cell of a memory.

SUMMARY OF THE INVENTION

It is accordingly an object of the invention to provide an apparatus and a method for creating color-calibration characteristic curves and/or process-calibration characteristic curves which overcome the above-mentioned disadvantages of the heretofore-known apparatuses and methods of this general type and which improve the cooperation between the prepress stage, the printing stage and the quality control stage.

With the foregoing and other objects in view there is provided, in accordance with the invention, in a printing system including a prepress stage, a printing stage, a quality control stage and data links for exchanging image generation information and color measuring data between the prepress stage, the printing stage and the quality control stage, an apparatus for creating color-calibration characteristic curves and/or process-calibration characteristic curves, including:
a computing device provided in the prepress stage; and
the computing device being configured to determine and/or transfer image generation information serving as a test pattern for generating at least one of color-calibration characteristic data and process-calibration characteristic data.

According to another feature of the invention, a computing device in the quality control stage receives image generation information, which serves as a test pattern, for generating color-calibration characteristic data and/or process-calibration characteristic data.

According to yet another feature of the invention, the computing device in the prepress stage is configured to create CIP3 files with test pattern information.

According to another feature of the invention, the computing device provided in the quality control stage is configured to create CIP3 files with test pattern information.

According to a further feature of the invention, a storage device is assigned to the prepress stage and/or the quality control stage.

According to another feature of the invention, a computing device in the quality control stage calculates an ICC (International Color Consortium) profile.

According to yet another feature of the invention, a computing device in the quality control stage calculates a process calibration.

With the objects of the invention in view there is also provided, a method of creating color-calibration characteristic curves and/or process-calibration characteristic curves, the method includes:

providing data links for exchanging image generation and color data between a prepress stage, a printing stage and a quality control stage;

creating image generation information in the prepress stage, the image generation information serving as a test pattern; and assigning the image generation information to a standardized data packet and supplying the image generation information to the quality control stage.

Another mode of the method according to the invention includes the steps of creating the image generation information as a rastered image generation information in the prepress stage; and selecting suitable test patterns from the rastered image generation information.

Yet another mode of the method according to the invention includes the steps of producing printing plates by using the image generation information created in the prepress stage; producing printed products in the printing stage; and supplying the printed products to the quality control stage.

A further mode of the method according to the invention includes the step of comparing the rastered image generation information with measurement data determined in the quality control stage.

Another mode of the method according to the invention includes the step of matching a local resolution of the image generation information and the measured data to one another.

A further mode of the method according to the invention includes the step of breaking an image into part images prior to performing the step of comparing the rastered image generation information created in the prepress stage with the measurement data determined in the quality control stage.

A further mode of the method according to the invention includes the step of obtaining data for a process calibration from the rastered image generation information created in the prepress stage.

Another mode of the method according to the invention includes the step of obtaining data for a printing diagnosis and a machine diagnosis from the rastered image generation information created in the prepress stage.

Another mode of the method according to the invention includes the step of obtaining data for a color management from the rastered image generation information created in the prepress stage.

According to the invention, a system is provided with which an exchange of information relating to the position and function of color measurement areas between the prepress stage, printing stage and quality control stage can be carried out. This information is used to determine an ICC profile and/or for the purpose of process calibration. In accordance with the apparatus according to the invention, many kinds of previously necessary manual tasks, which are required to determine the ICC profile (International Color Consortium), are dispensed with. For example, the manual definition of the position of the test mask, the selection of a suitable measurement mask and then the calculation of the ICC profile are dispensed with.

In a first step, a link between the image generation data from the process chain (prepress stage, printing stage and quality control stage) is automatically made accessible. This means that, if the image generation data is that which originates from a special test form, the resultant advantage is that strict compliance with the test pattern sequence does not have to be maintained. In addition, the quality control stage does not have to be informed as to which type of test pattern this is.

A further advantage of the apparatus according to the invention is that, in order to determine the process calibration, previously necessary manual activities are likewise unnecessary. A lengthy and tiresome procedure in which, by using predefined test patterns, the process calibration is carried out is rendered superfluous by the apparatus according to the invention. For the process calibration, it is possible to determine areas which are suitable as test patterns directly from each printing form with which the corresponding print jobs are carried out. Should all the required test patterns not be present in a printing form, those present are defined in an appropriate way and the measured information obtained from this is accumulated in a memory and, over a relatively long period, is adapted to the machine. One advantageous refinement is to feed the data from the calculation of the process calibration directly to the prepress stage.

According to the apparatus according to the invention, hardware preconditions are created which, as compared with the prior art, permit an advantageous analysis of the printed image and, moreover, reduce the expenditure on time and costs to a considerable extent.

By matching the prepress data with the colorimetric image data obtained through the use of spectral measurement, a print analysis can be carried out without using a special test form. The colorimetric image data determined through the use of a spectral measurement have the advantage that a representation in all other color spaces, such as LAB (L—Lightness, A—redness-greenness, B—blueness-yellowness), RGB (Red Green Blue), XYZ (Norm Color System), is possible through the use of purely mathematical transformation of the image data. The print analysis includes, for example, the generation of process-calibration characteristic curves (PCA) and color management profiles (CM), the control of the validity of CM profiles, the determination of control parameters for color control (for example LAB values of the full tones), the control of the tonal value gain, information about the state of the printing machine (for example damping) with appropriate advice for the printer or control instructions to the machine control system, and the inspection of the printed image for completeness or faults. By linking the quality control stage to the prepress stage, the image structure is known, that is to say the percentage proportions of CMYK (cyan, magenta, yellow, black) and the associated X/Y coordinates.

As a rule, the local resolution of the CMYK image build-up data does not coincide with the local resolution of the color measuring instrument present in the quality control stage, for which reason, in a first step, both items of information are brought to an identical resolution by combining image points in the higher-resolution image. If the resolution differences do not stand in an integer relationship, the combination is implemented through the use of interpolation. The printed image is then analyzed and a search is made for image areas which are suitable for the desired analysis. The suitable areas are also distinguished by the fact that the tonal values or the color locus of an image point and of the adjacent image points lie within a given tolerance. Then, the measured values from the suitable areas are examined for plausibility and evaluated in accordance with the criterion.

One method of comparing the measured image with the prepress image is for the measured image and the prepress image to be compared with each other separation by separation. Separation means the various color separations cyan, magenta, yellow and black or else red, green, blue. If it is possible for one of the images to be distorted or rotated, then each of the images is divided up beforehand into a relatively large number of part images and a corresponding correlation of the respective part images is carried out. The result of the correlation of the measured image with the prepress image is a displacement vector with which, for example, the prepress image is corrected. The images brought into coincidence in this way (measured image and prepress image) can then be subjected to image analysis, in order to obtain from this, if necessary, corrections of the print and the information needed to check the setting of parameters for the printing machine.

For this purpose, various image analysis possibilities are provided:

A) Examination of detached full-tone colors.
B) Examination of full-tone colors in all zones.
C) Examination of full tones at print start and print end.
D) Examination of superimposed prints of full-tone colors (secondary and tertiary colors).
E) Examination of individual raster areas of any area coverage.
F) Examination of medium-tone areas at the print start.
G) Examination of raster combinations.
H) Examination of homogeneous image points.
I) Examination of unprinted points in order to determine paper white.
J) Examination of coherent printing areas in order to create an object list, etc.

As a rule, all the above items of information i.e. the raster combinations of the test form according to IT-8.7 are not available in every print, but this is not necessary. Therefore, in order to set the parameters of the printing machine, for example the necessary information can be collected over many print jobs and used to derive a parameter setting.

In order to set the inking of the current print job, every available item of information is important, in order to correct the currently calculated model parameters in accordance with those of the inking and, derived from the latter, the recommended adjustment to the zone screws or ink screws are calculated. If, for example, a single full-tone color is found, then the spectral characteristics of the color stored in the color database are corrected from the associated measured value together with the registered paper spectrum. Furthermore, this can be used to determine the current density value or LAB value and, through the use of a comparison with the predefined desired value, to calculate a correction value.

A particularly important value for the control of the inking is the ink absorption of the inks which are overprinted, since this generally can be predetermined only poorly, but has a considerable influence on the inking in the print. However, given the presence of a measurement area, this can be determined directly from the print in accordance with the examination listed under (D), and can therefore again be included in the calculation of the manipulated variables.

For each printing machine, a defined printing characteristic curve is assumed, which is already incorporated in the calculation of the color separations in the raster image processor and of which it is assumed that it remains constant. The more measurement areas are found, in accordance with the examination (E) listed above, the more accurately may compliance with these boundary conditions be checked and the more accurately can the calculation of the manipulated variables for the inking be carried out. The object list enumerated under item (J) can lead to printing being made significantly easier, since by using this the entire print can be checked both for completeness and also for the presence of printing errors such as hickeys, strips and splashes, and searching for them is therefore made easier for the printer, especially in the setting phase. By using the medium-tone areas at the print start, mentioned under item (F), it is possible for erroneous settings of the damping to be monitored with reasonably high accuracy since a slight shading of these areas can already count as a first indication. The multicolor full-tone edges mentioned under (D) react very sensitively to register variations, so that they can be used to monitor the latter.

According to the invention, then, a number of image points are combined into a measurement area required for the quality measuring device. In this case, it is important that all the combined image points contain the same color information. In order to obtain an appropriate measurement area, it is therefore necessary to check whether the surroundings of the image point which are combined to form the test field are homogeneous. This can be carried out by the descriptive lightness values (XYZ) and tonal values (CMYK) in the image point being compared and a combination of these image points to form a measurement area being ensured only if there is homogeneity. Under certain circumstances, a predefined tolerance, for example $\Delta E=0.5$, can still be considered to be homogeneous, wherein the tolerance can be provided such that it can be input individually. This checking of the suitability of a measurement area can be carried out for all the measurement areas (A-J) mentioned above.

All of the image points whose tonal values correspond to those combined to form a test field is examined for outliers. For this purpose, the color error $\Delta E$ of all these image points from a reference value and the standard deviation of this value are calculated. This reference value can be, for example, the average standard calorimetric value of all these values or the current standard calorimetric value from the measurement value file. Of the image points which lie within a specific tolerance, the average of the tonal values and of the XYZ values is calculated. Then, the tonal values and the standard calorimetric values of the relevant test area in the measured value file are updated with these average values.

By using the measurement value file, a new color management profile can then be calculated, and can then be used in the prepress stage in order to adapt output devices (e.g. proofer, computer to plate, scanner, . . . ).

Other features which are considered as characteristic for the invention are set forth in the appended claims.

Although the invention is illustrated and described herein as embodied in an apparatus and a method for creating color- and/or process-calibration characteristic curves, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
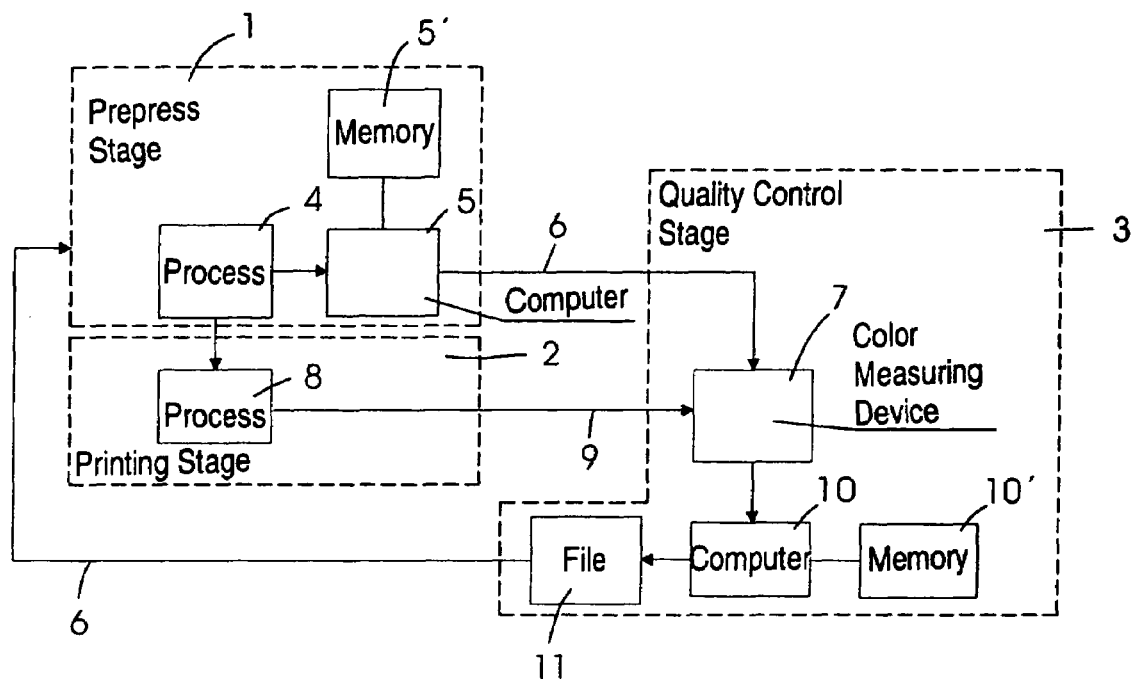
FIG. 1 is a block diagram of the prepress stage, printing stage and print control stage for determining the ICC profile in accordance with the invention.

Referring now to the figures of the drawings in detail and first, particularly, to FIG. 1 thereof, there is shown a block diagram of the cooperation between a prepress stage 1, a printing stage 2 and a quality control stage 3. In the prepress stage 1, a test form is set up in a process 4. It is not necessary for the test form to include defined patterns—it can instead be any desired original. In a computer 5, either during or following the setting up of the test form, a file is created which contains information about the test form. This file is supplied through the use of a connection 6 to a color measuring instrument 7. The connection 6 can either be a cable connection, a wire-free connection or any other connection. The exchange of the file can be carried out via a standardized data exchange, for example CIP3, it also being possible here for an exchange to be carried out using another standard or even without a standard. Associated with the computer 5 is a memory 5' in order to be able to store the test forms set up in the process 4. This is advantageous, since even individually set up test forms which are matched to the specific print jobs can be created in the process 4. In the printing stage 2, in a further process 8, the test form is printed through the use of a regular printing machine. The printed product created by the test form is supplied to the color measuring instrument 7 through the use of a supply 9. This supply 9 can be carried out either by providing a measuring instrument in line in the printing machine which, so to speak, signifies the fusing of the prepress stage 2 and quality control stage 3, or the supply 9 can also be carried out by the printer removing a proof sheet from the printing machine and supplying this to the color measuring instrument 7. In both cases, the values recorded by the color measuring instrument 7 are provided with a statement of location (X, Y coordinate) in order that these can be compared with the desired values. The measured values recorded by the color measuring instrument 7 from the printed product created in the printing stage 2 are supplied to a computer 10. The computer 10 calculates the ICC profile from these measured values. Through the use of a connection 6, the computer 10 supplies a file 11 to the prepress stage. The file 11 contains a so-called CIP4 file (Job Definition Format) with ICC reference. Associated with the computer 10 is a memory 10', in which the measured values recorded by the color measuring instrument 7 are stored. Storing the measured values is advantageous if the printed product created does not contain all the test forms which are needed for the color calibration and/or process calibration. This is the case when only a limited number of test areas can be obtained from a normal print job. Alternatively, the computer 10 creates a file which contains characteristic curves for process calibration.

Figure 2:
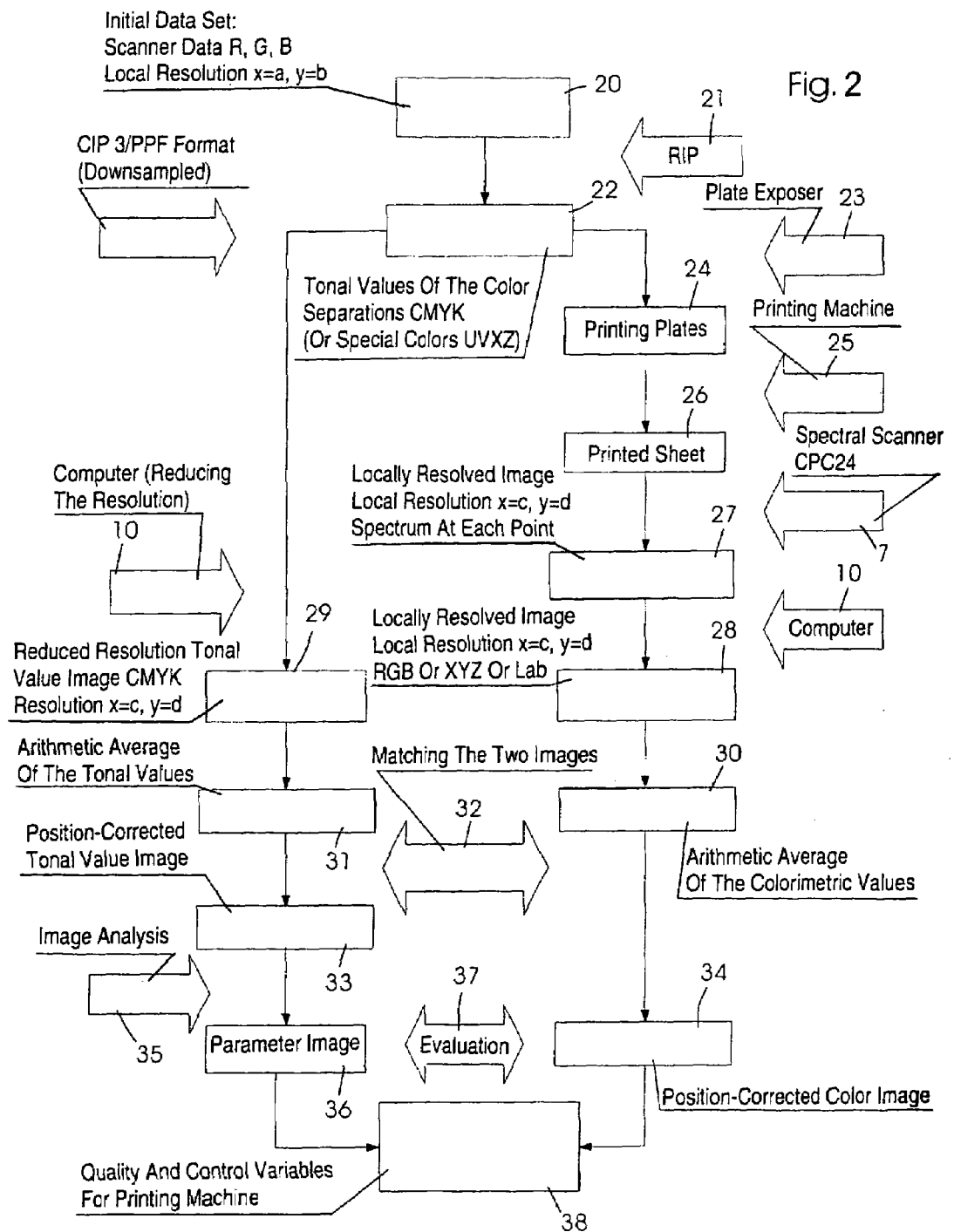
FIG. 2 is a flowchart for illustrating steps for obtaining the characteristic curves for a process calibration or a color calibration in accordance with the invention.

FIG. 2 shows a flowchart in which the method steps for obtaining the characteristic curves for process calibration or color calibration are represented. The initial basis is formed by a data set 20 which contains the scanner data (RGB) and the associated local resolution (x=a, y=b). Through the use of a raster image processor (RIP) 21, these are used to generate the tonal values 22 of the color separations of the primary colors (CMYK) or of the special colors (UVXZ). Another variant in order to obtain the data for a plate exposure is for these data for the plate exposer 23 already to be present in electronic form, for example as CIP3 or PPF format (Print Production Format). Using the tonal values 22, a plate exposer 23 creates the printing plates 24 for the various color separations. In a printing machine 25, printed sheets 26 are produced by the known offset printing process. Through the use of a color measuring instrument 7 which, for example, can be a spectral scanner, a data set 27 is determined which describes the color spectrum of each measured image point, with a statement of the local resolution. A computer 10 connected downstream uses the data set 27 to calculate a further data set 28 with which the measured image is described in the color spaces RGB, XYZ or LAB etc. The arithmetic average 30 of the color values is then formed.

In a further branch, through the use of the computer 10, the resolution of the tonal values 22 or of the desired values present in the CIP3 or PPF format are reduced to the resolution which is predefined by the color measuring instrument 7. A reduced-resolution image 29 is referred to in this case. Here too, arithmetic averaging 31 of the tonal values is carried out. At this point, a so-called matching 32 of the averaged tonal values 31 and of the averaged calorimetric values 30 can be carried out, which is used to define the positional differences of the two images in relation to each other. It is then possible either to perform a positional correction 33 of the averaged tonal value image 31 or a positional correction 34 of the averaged calorimetric values. In an image analysis 35, those parts of the tonal value image which are defined as test areas according to A-J are determined. The test areas defined in this way are designated a parameter image 36, and are evaluated with the possibly position-corrected color image 34 in an evaluation 37. The result obtained is color-calibration characteristic curves and/or process characteristic curves 38 which can be used to control the process chain including the prepress stage, printing stage and quality control stage.

According to the flowchart described in FIG. 3, the color measuring instrument 7 itself determines the local resolution of the measured image. However, it is also conceivable that the identification of the location of the measured image is carried out by indicating fixed points belonging to a previously defined positioning of measurement areas.

We claim:

1. In a printing system including a prepress stage, a printing stage, a quality control stage and data links for exchanging image generation information and color measuring data between the prepress stage, the printing stage and the quality control stage, an apparatus for creating at least one of color-calibration characteristic curves and process-calibration characteristic curves, comprising:
   a computing device provided in the prepress stage, said computing device being configured to at least one of determine and transfer image generation information;
   a color measuring instrument; and
   a further computing device provided in the quality control stage, said further computing device receiving a data set from said color measuring instrument, defining test areas, serving as a test pattern, and evaluating at least one of color-calibration characteristic data and process-calibration characteristic data.

2. The apparatus according to claim 1, including a further computing device provided in the quality control stage for calculating a process calibration.

3. The apparatus according to claim 1, wherein said computing device provided in the prepress stage is configured to create CIP3 files with test pattern information.

4. The apparatus according to claim 1, wherein said further computing device provided in the quality control stage is configured to create CIP3 files with test pattern information.

5. The apparatus according to claim 1, including a storage device operatively connected to said computing device in the prepress stage.

6. The apparatus according to claim 1, including a storage device operatively connected to said further computing device in the quality control stage.

7. The apparatus according to claim 1, including a further computing device provided in the quality control stage for calculating an ICC profile.

8. A method of creating at least one of color-calibration characteristic curves and process-calibration characteristic curves, the method which comprises:
providing data links for exchanging image and color data between a prepress stage, a printing stage and a quality control stage;
at least one of determining and transferring image generation information in the prepress stage;
providing a data set in a color measuring instrument; and
transmitting the data set from the color measuring instrument to the quality control stage for defining test areas, serving as a test pattern, and evaluating at least one of color-calibration characteristic data and process-calibration characteristic data.

9. The method according to claim 8, which comprises:
creating the image generation information as rastered image generation information in the prepress stage; and
obtaining data for a printing diagnosis and a machine diagnosis from the rastered image generation information.

10. The method according to claim 8, which comprises:
creating the image generation information as rastered image generation information in the prepress stage; and
obtaining data for a color management from the rastered image generation information.

11. The method according to claim 8, which comprises:
producing printing plates by using the image generation information created in the prepress stage;
producing printed products in the printing stage; and
supplying the printed products to the quality control stage.

12. The method according to claim 8, which comprises:
creating the image generation information as a rastered image generation information in the prepress stage; and
comparing the rastered image generation information with measurement data determined in the quality control stage.

13. The method according to claim 12, which comprises matching a local resolution of the image generation information and the measured data to one another.

14. The method according to claim 12, which comprises breaking an image into part images prior to performing the step of comparing the rastered image generation information with the measurement data determined in the quality control stage.

15. The method according to claim 8, which comprises:
creating the image generation information as a rastered image generation information in the prepress stage; and
obtaining data for a process calibration from the rastered image generation information.

* * * * *